(12) United States Patent
Doerr (10) Patent No.: US 7,403,670 B1
(45) Date of Patent: Jul. 22, 2008

(54) COMPACT OPTICAL MODULATOR

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/651,824

(22) Filed: Jan. 10, 2007

Related U.S. Application Data (60) Provisional application No. 60/879,312, filed on Jan. 8, 2007.

(51) Int. Cl.
*G02F 1/225* (2006.01)
(52) U.S. Cl. .................................. 385/1; 385/2; 385/3
(58) Field of Classification Search ................. None
See application file for complete search history.

(56) References Cited

U.S. PATENT DOCUMENTS

| | | | |
|---|---|---|---|
| 6,175,671 B1 * | 1/2001 | Roberts | 385/14 |
| 2002/0003641 A1 * | 1/2002 | Hall et al. | 359/122 |
| 2003/0053754 A1 * | 3/2003 | Doerr | 385/39 |
| 2004/0184723 A1 * | 9/2004 | Chandrasekhar et al. | 385/27 |
| 2007/0071453 A1 * | 3/2007 | Liu et al. | 398/183 |

OTHER PUBLICATIONS

F. Devaux et al. Optical processing with electroabsorption modulators. Optical Fiber Communication Conference and Exhibit, 1998 (OFC '98), Technical Digest, pp. 285-287. Feb. 1998.*

U.S. Appl. No. 12/006,194, filed Dec. 31, 2007, Christopher Doerr, et al.

R. Griffin, et al., "Integrated DQPSK Transmitter for Dispersion-Tolerant And Dispersion-Managed DWDM Transmission", *Optical Fiber Communication Conference*, Atlanta, GA., 2003, Paper FP6., 2 pages.

K. Higuma, et al. "A Bias Condition Monitor Technique For the Nested Mach-Zehnder Modulator", *IEICE Electronics Express*, vol. 3, 2006, pp. 238-242.

L. Zhang et al., "Low-Voltage High-Speed Traveling Way InGaAsP-InP Phase Modulator", *IEEE Photon. Technol. Lett.*, vol. 16, Aug. 2004, pp. 1831-1833.

H.N. Klein, et al., "1.55 µm Mach-Zehnder Modulators on InP For Optical 40/80 Gbit/s Transmission Networks", *Integrated Photonics Research M*, Princeton, NJ., 2006, Paper TuA2.4., pp. 171-173.

R.G. Walker, "High-Speed III-V Semiconductor Intensity Modulators", *IEEE J. Quantum Electron.*, vol. 27, No. 3, Mar. 1991, pp. 654-667.

H. Kawanishi, et al., "EAM-Integrated DFB Laser Modules With More Than 40 GHz Bandwidth", *IEEE Photon. Technol. Lett.*, vol. 13, Sep. 2001, pp. 954-956.

I. Kang, "Interferometric Operation Of An Electroabsorption Modulator For PSK Modulation And OOK Modulation With Performance Enhancements", *European Conf. Opt. Comm.*, Cannes, France, 2006, Paper We3.P.59. 2 pages.

(Continued)

*Primary Examiner*—Hemang Sanghavi
*Assistant Examiner*—Mike Stahl (57) ABSTRACT

A novel design for an optical differential quadrature phase shift keying (DQPSK) modulator comprises two intensity modulators in a three-arm interferometer.

6 Claims, 10 Drawing Sheets

OTHER PUBLICATIONS

Takahide Sakamoto, et al., "50-Gb/s 16 QAM by a quad-parallel Mach-Zehnder modulator," *European Conference on Optical Communication*, paper PD 2.8, Berlin, Sep. 2007, 2 pages.

C.R. Doerr, et al., "Compact EAM-Based InP DQPSK Modulator and Demonstration at 80 Gb/s," in *National Fiber Optic Engineers Conference*, Anaheim, CA, Mar. 25, 2007, *OSA Technical Digest Series* (*CD*) (*Optical Society of America, 2007*), paper PDP33, 3 pages.

C.R. Doerr, et al., "Compact, high-speed, InP DQPSK modulator," *IEEE Photonics Technology Letters*, vol. 19, No. 15, (Aug. 1, 2007) pp. 1184-1186.

Inuk Kang, "Phase-shift-keying and on-off-keying with improved performances using electroabsorption modulators with interferometric effects," Optics Express, vol. 15, No. 4, (Feb. 19, 2007), pp. 1467-1473.

* cited by examiner

COMPACT OPTICAL MODULATOR

CROSS-REFERENCE TO RELATED APPLICATIONS

This application claims the priority of Provisional Application Ser. No. 60/879,312 filed on Jan. 8, 2007, which is incorporated herein by reference.

FIELD OF THE INVENTION

This invention relates generally to the field optical communications and in particular to an optical modulator for creating a high-speed optical data signal.

BACKGROUND OF THE INVENTION

Next generation Ethernet is likely to have a data rate around 100 Gb/s. One possibility to accomplish 100-Gb/s transmission is the use of a multiplex of parallel lower-speed channels. However, the parallel approach typically has a low spectral efficiency, requires temporal de-skewing among channels, and has a large footprint or consumes significant chip real-estate. Another possibility is the use of a single 100-Gb/s serial channel. With a multi-level modulation format, such as differential quadrature phase-shift keying (DQPSK), in which the data is encoded using four different phase levels, the serial approach can have a high spectral efficiency, and there is no need for de-skewing. Many existing 10-Gb/s systems use pluggable transceivers. It would be highly desirable to make a 100-Gb/s multi-level modulator that is small enough to fit in a pluggable transceiver.

DQPSK modulators demonstrated to date have been too large for a pluggable transceiver because they employ phase modulators based on GaAs or LiNbO$_3$. A reported GaAs DQPSK modulator was 52 mm long, R. Griffin, R. Johnstone, R. Walker, S. Wadsworth, A. Carter, and M. Wale, "Integrated DQPSK transmitter for dispersion-tolerant and dispersion-managed DWDM transmission," *Optical Fiber Communication Conference*, paper FP6, 2003, and a reported LiNbO$_3$ DQPSK modulator was more than 43 mm long, K. Higuma, S. Mori, T. Kawanishi, and M. Izutsu, "A bias condition monitor technique for the nested Mach-Zehnder modulator," *IEICE Electronics Express*, vol. 3, pp. 238-242, 2006. These modulators use a traditional DQPSK modulator design consisting of a nested pair of Mach-Zehnder modulators.

The existing modulators are so long because of the relatively weak electro-optic effect in GaAs and LiNbO$_3$. A solution is to make this design in InP, which has a much stronger electro-optic effect in the C-band by using the quantum-confined Stark effect. However, despite an increased electro-refractive effect, a phase shifter in InP with a reasonable $V_\pi$ is still quite long, 0.5, L. Zhang, J. Sinsky, D. Van Thourhout, N. Sauer, L. Stulz, A. Adamiecki, and S. Chandrasekhar, "Low-voltage high-speed traveling wave InGaAsP-InP phase modulator," *IEEE Photon. Technol. Lett.*, vol. 16, pp. 1831-1833, August 2004 to 4 mm, H. N. Klein, H. Chen, D. Hoffmann, S. Staroske, A. G. Steffan, and K.-O. Velthaus, "1.55 µm Mach-Zehnder modulators on InP for optical 40/80 Gbit/s transmission networks," *Integrated Photonics Research M*, paper TuA2.4, 2006, and so requires a traveling-wave structure. A traveling-wave structure in InP is highly demanding to fabricate.

Thus there is a need for a new approach to making a DQPSK modulator.

SUMMARY OF THE INVENTION

I have developed—according to the present invention—a highly compact DQPSK modulator design. The design is so compact because it uses the electro-absorption (EA) effect rather than the electro-refraction effect, and because it requires only one interferometer.

The modulator consists of an at least three-arm interferometer with EA modulators (EAMs) in at least two of the at least three arms. This device can be made fully integrated in a semiconductor material such as InP.

BRIEF DESCRIPTION OF THE DRAWING

A more complete understanding of the present invention may be realized by reference to the accompanying drawings in which:

FIG. 3 is are schematics and photographs of an optical device according to the present invention.

DETAILED DESCRIPTION

Figure 1:
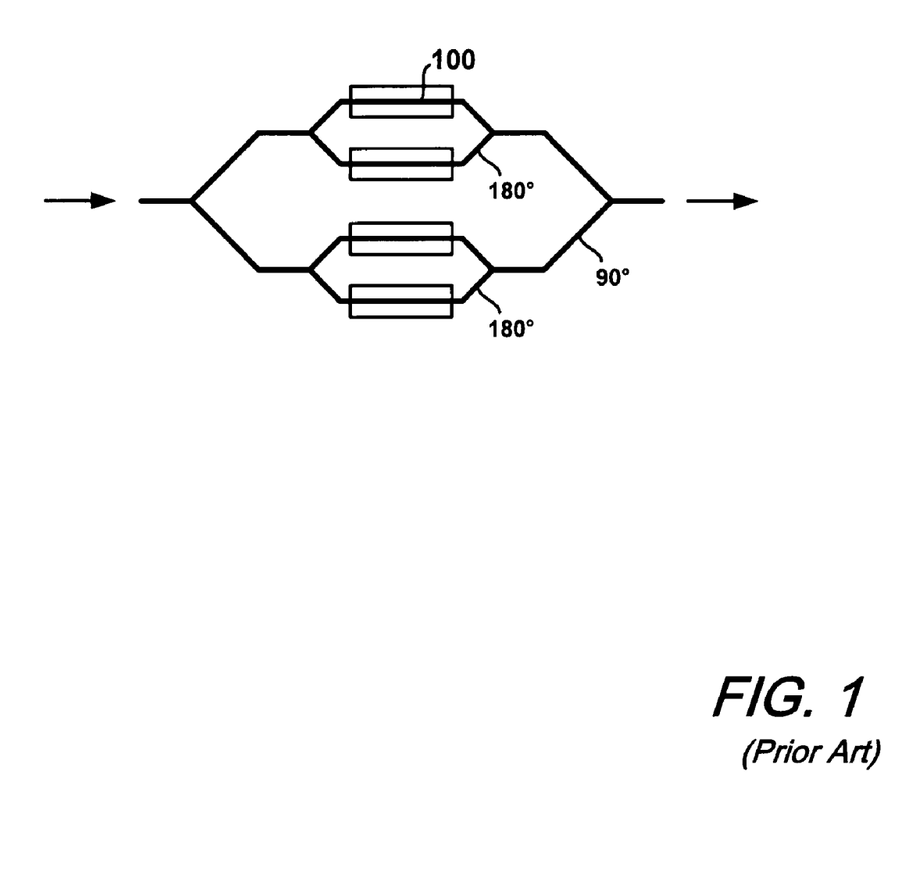
FIG. 1 is a schematic of a prior art DQPSK modulator.

A prior art DQPSK modulator design is shown in FIG. 1. It consists of two small Mach-Zehnder interferometers (MZIs) contained within a large MZI. Each small MZI constains phase modulators, 100. This modulator is large in size because it has multiple stages and because phase modulators are long. Also, high-speed phase modulators are challenging to fabricate because of their traveling-wave nature.

My proposal to make a compact DQPSK modulator is to instead use the electro-absorption (EA) effect in InP. An InP EA modulator (EAM) can be as short as 100 µm. Thus, up to modulation bandwidths of 40-50 GHz, the EAM can be operated as a lumped element instead of a traveling-wave structure, R. G. Walker, "High-speed III-V semiconductor intensity modulators," *IEEE J. Quant. Electron*, vol. 27, pp. 654-667, March 1991, and H. Kawanishi, Y. Yamauchi, N. Mineo, Y. Shibuya, H. Murai, K. Yamada, and H. Wada, "EAM-integrated DFB laser modules with than 40 GHz bandwidth," *IEEE Photon. Technol. Lett.*, vol. 13, pp. 954-956, September 2001, greatly simplifying design and fabrication. Using an EAM for a PSK format was first demonstrated in I. Kang, "Interferometric operation of an electroabsorption modulator for PSK modulation and OOK modulation with performance enhancements," *European Conf. Opt. Comm.*, paper We3.P.59, 2006 by exciting both polarizations of an EAM. In our design, two EAMs are used in a three-arm interferometer to create the DQPSK signal. Because EAMs have a steep response function of transmission vs. voltage, close to digital phase modulation can be produced, as it is in the case of the nested MZI design. Another advantage to using InP is the monolithic integration potential with a laser and an optical gain element.

Figure 2:
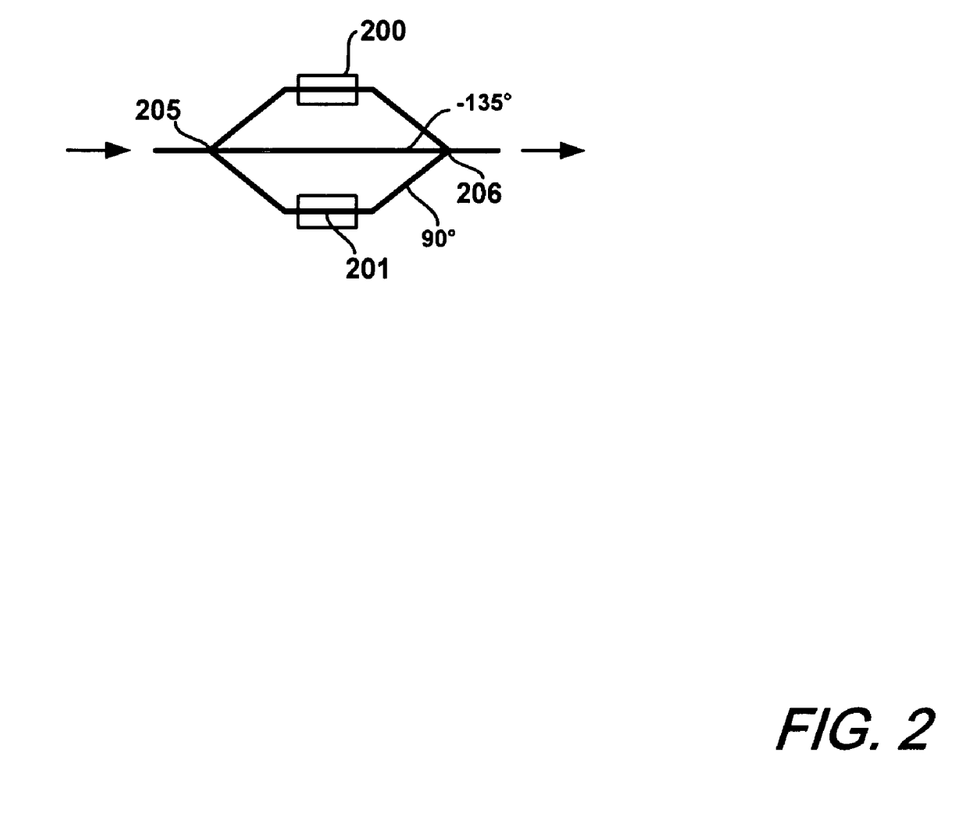
FIG. 2 is a schematic of an embodiment of the present invention.

The proposed DQPSK modulator is shown in FIG. 2. It consists of two EAMs, 200 and 201, in a three-arm interferometer. The two outer arms have a 90° phase difference, and the center arm has a 135° phase difference from both outer arms. An implemented version is shown in FIG. 3. The required power splitting ratio of each 1×3 coupler is 37%, 26%, 37% (more precisely, the ratio is $\sqrt{2}$:1: $\sqrt{2}$ all divided by 1+2$\sqrt{2}$). If the EAMs have a finite extinction ratio, then the optimum splitting ratio is slightly different. In such a case, the phase of the center arm must be adjusted to account for EAM chirp.

Figure 4:
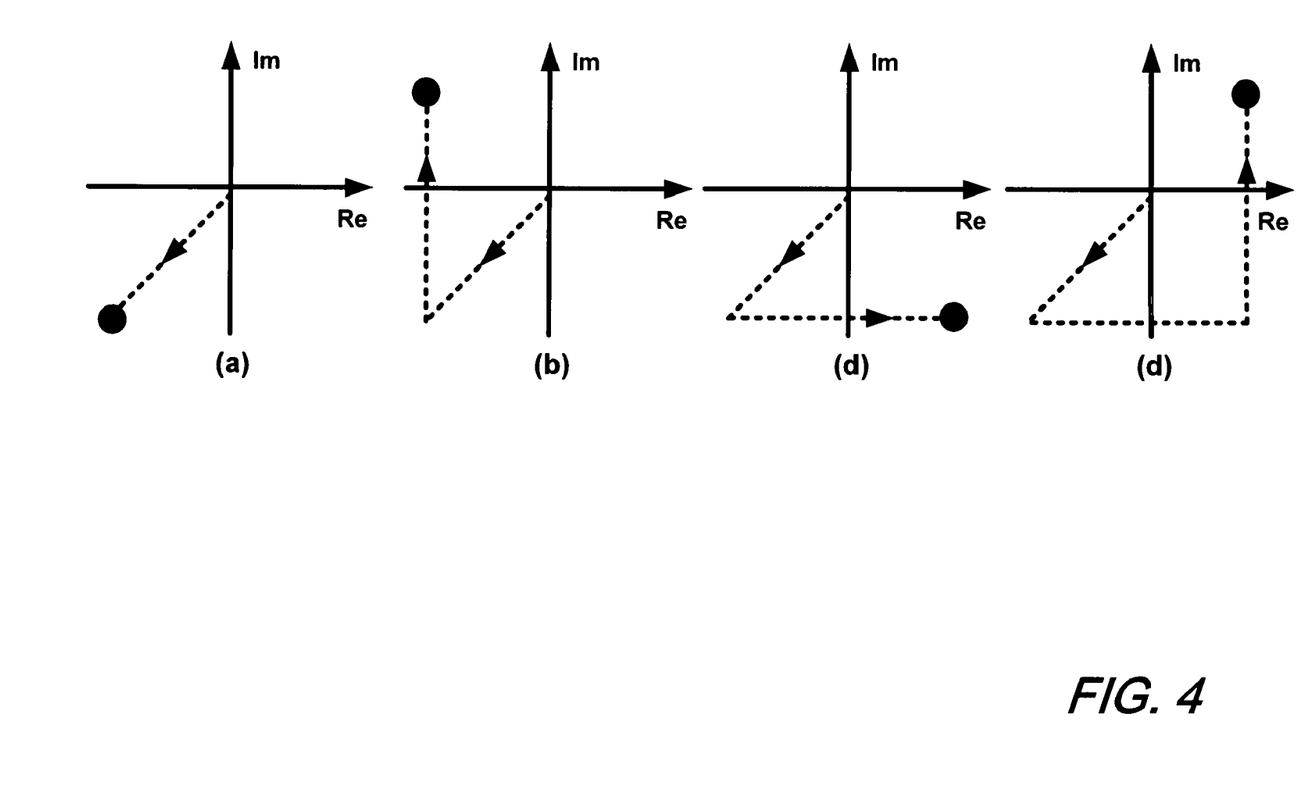
FIG. 4 is a series of diagrams explaining how the present invention works.

FIG. 4 explains how the four phase levels of DQPSK are achieved. The four symbols produced by turning on and off the two EAMs lie on the four corners of a square in the complex plane. The center arm is responsible for placing the origin of the complex plane in the middle of the square. For example, when both EAMs are fully attenuating only the center arm transmits light, so the phase is −135° as shown in FIG. 4a. Setting either EAM to transparency then moves the phasor up (b) or to the right (c). Setting both to transparency moves the phasor to the upper right point (d). The chirp of the EAMs causes the phasor to follow a curved trajectory between the four dots. The inherent transmission through the modulator is 1/(9+4 $\sqrt{2}$)=−11.7 dB, which could be compensated for by integrating a semiconductor optical amplifier (SOA) in future designs. Note that the signal from the modulator could be considered a DQPSK or a QPSK signal, depending on how it is detected. Essentially, DQPSK is detected using a one-bit-delay interferometer, whereas QPSK is detected by interfering it with a local oscillator. For convenience, we will refer to the modulator only as a DQPSK modulator, realizing that it is a QPSK modulator, as well.

Figure 3A:
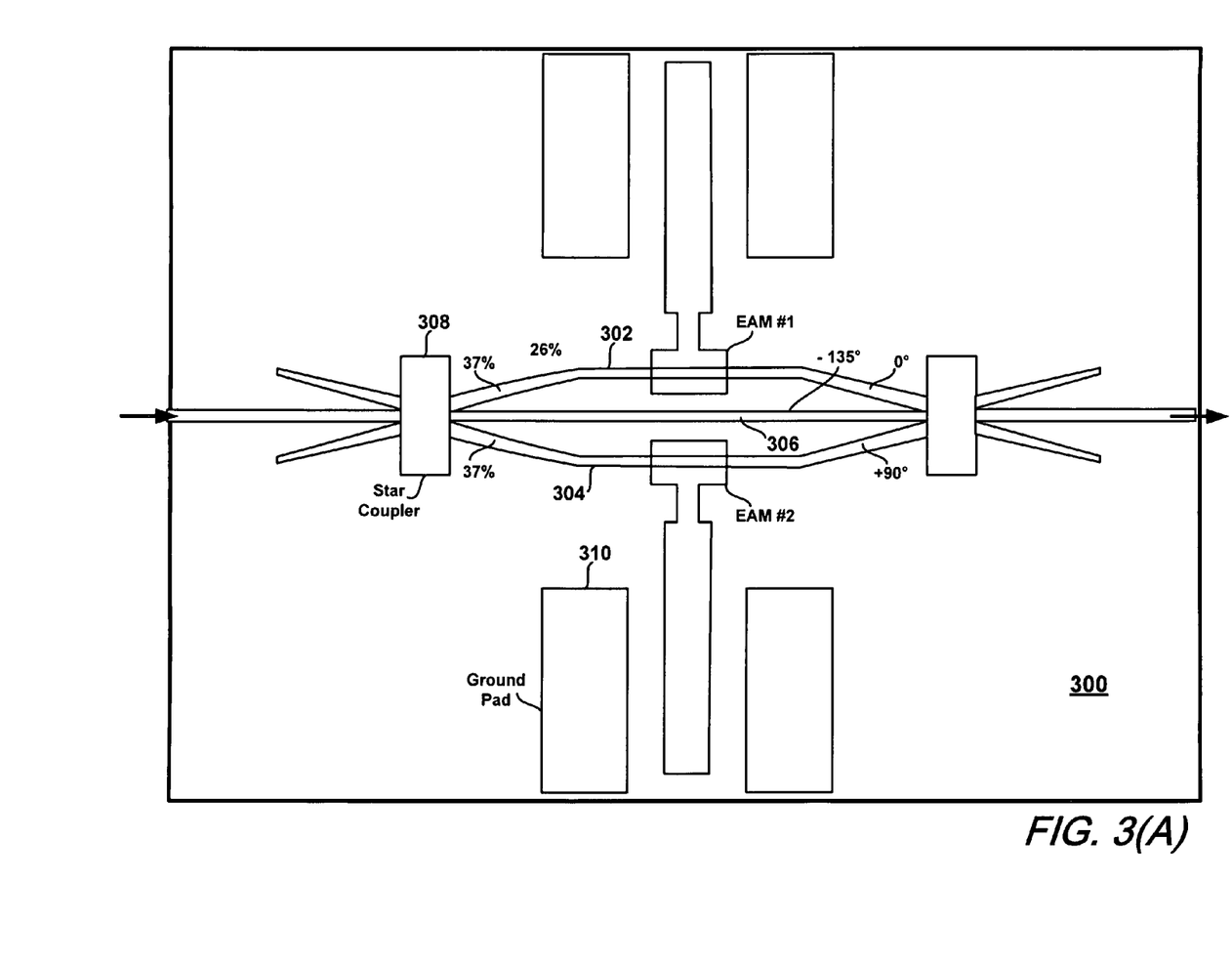
FIG. 3a is a schematic of the optical modulator, stretched vertically for clarity.
Figure 3B:
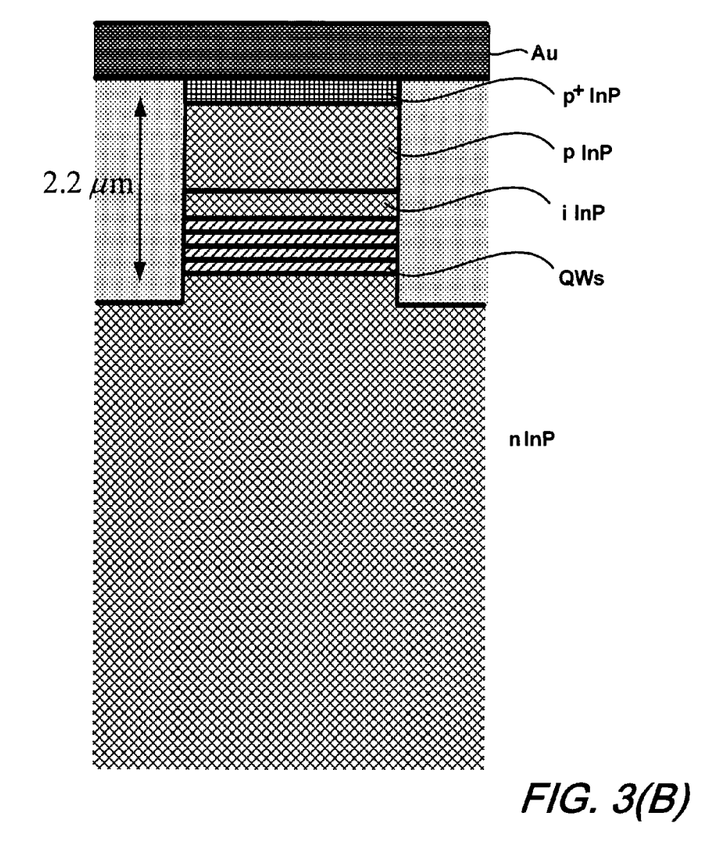
FIG. 3b is a cross-section of the waveguide structure in the EAM.
Figure 3C:
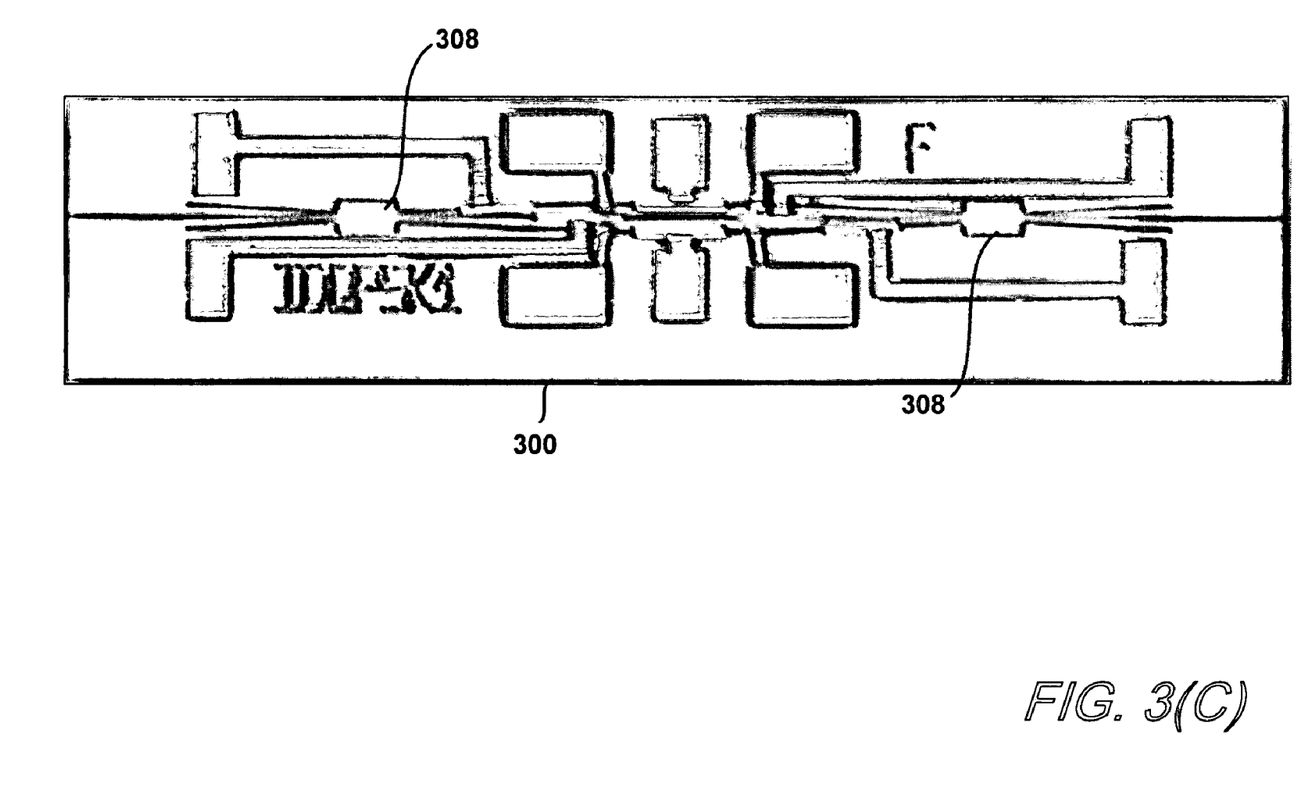
FIG. 3c is a photograph of the actual modulator (the size is 1.5 mm×0.25 mm)
Figure 3D:
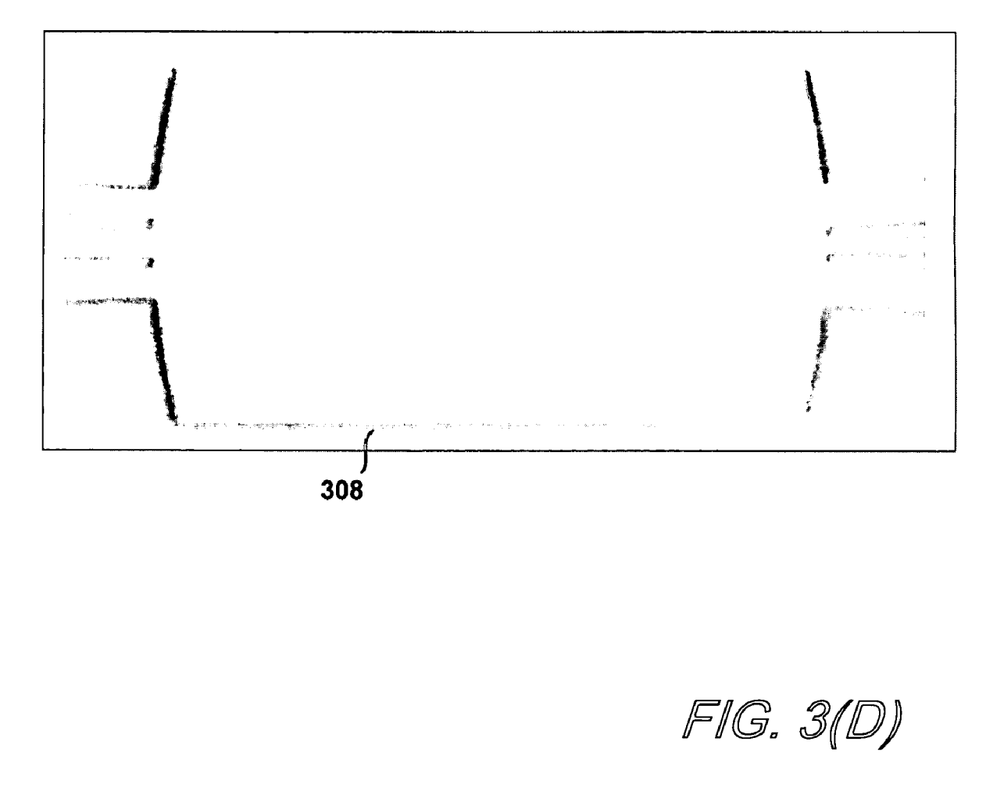
FIG. 3d is a zoomed-in photograph of the left-hand star coupler.

I now describe the fabrication and testing of an implementation of the present invention. The modulator 300 contains two EAMs and four static phase shifters (see FIGS. 3a and c). One static phase shifter is on the upper arm 302, one on the lower arm 304, and two on the center arm 306. The static phase shifters can be driven with a positive or negative voltage. With a negative voltage, the shifter also attenuates. The desired 1×3 coupler power splitting ratio is achieved by using a star coupler 308 with a narrower center waveguide inlet than the inlets of the outer waveguides, as shown in FIG. 3d. The layer stack is shown in FIG. 3b. The EAM waveguide width is 1.8 μm (on the mask), and the length is 115 μm.

The device fabrication is as follows: on a regular 2-inch n-doped InP wafer a 2-μm thick n-doped InP layer is grown, followed by 8 quantum wells (QWs) sandwiched between 10-nm 1.3-μm-bandgap InGaAsP separate confinement layers, a 250-nm undoped InP layer, a 1.4-μm p-doped InP layer with gradually increased doping, and finally a heavily p-doped InGaAs layer. The QWs are 0.3% tensile strained with compressive strained barriers. This layer structure is shown in FIG. 3b.

The first processing step is removing the heavily p-doped InGaAs layer over the passive waveguides, mainly for electrical isolation reasons. Then the waveguides are reactive-ion etched using silica as a mask, to a depth of 2.2 μm. Benzocyclobutene (BCB) is then spun on and cured. Ground pads 310 are etched through the BCB to the n-doped InP. Then small openings in the BCB are etched over the modulators and static phase shifters. Then the top-side metal is deposited, patterned via lift-off. Finally the wafer is thinned and back-side metal is deposited. The EAMs and passive waveguides both contain the same QWs. This greatly simplified my fabrication, but also resulted in high loss for the entire device. Future designs will have different bandgaps for the passive waveguides and the EAMs.

The modulator chip was cleaved out and soldered to a metal submount. Experiments were performed with the modulator at room temperature. The modulator was accessed optically via lensed fibers and electrically via two high-speed probes with internal 50-ohm termination and four single-needle probes. The band edge of the QWs is at ~1540 nm. The waveguide loss at wavelengths much longer than the band edge is ~2 dB/mm. For the following experiments I launched a CW wavelength of 1540.3 nm from an external cavity laser into the modulator.

Figure 5:
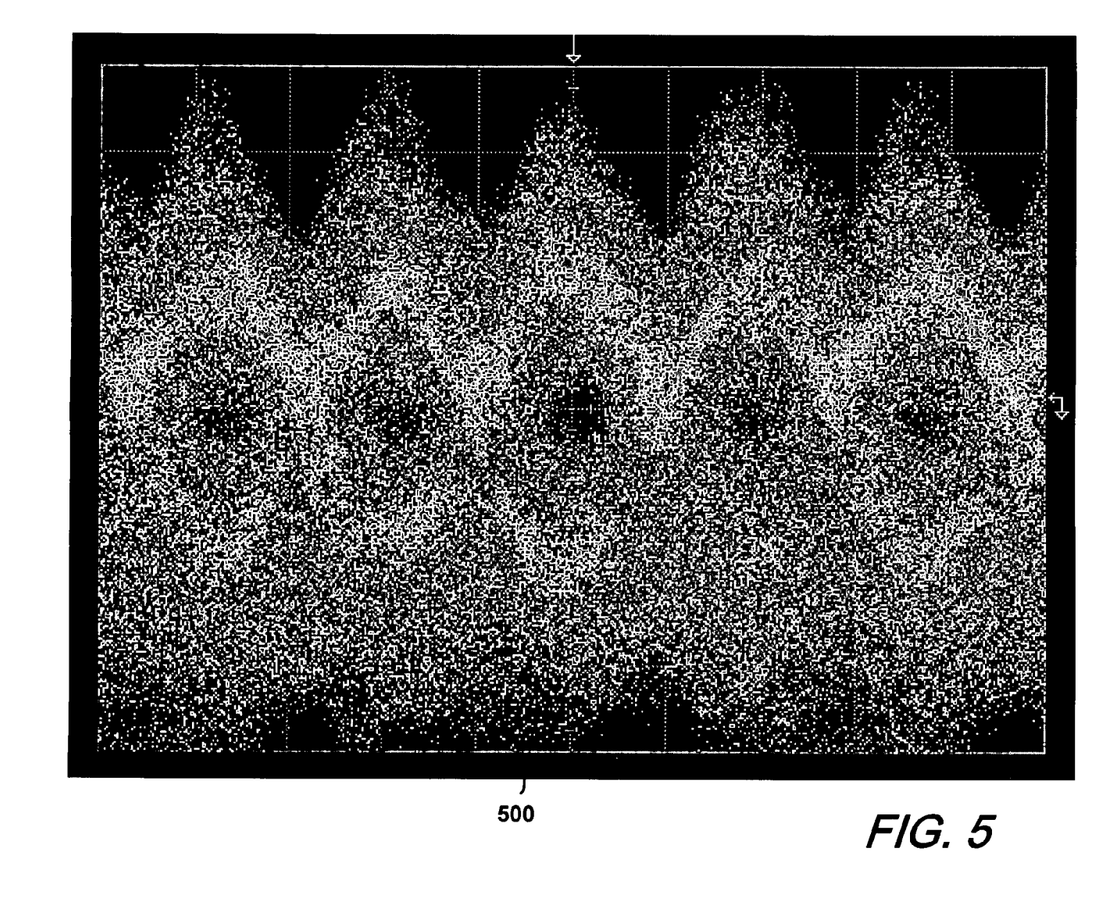
FIG. 5 is a measured eye diagram of a demodulated DQPSK signal generated by our invention at 107 Gb/s.

To generate DQPSK, two high speed probes were applied to the two EAMs and were driven with two delayed and inverted copies of the 53.5-Gb/s data stream. We adjusted the static phase shifters in order to obtain the desired phases of the three arms to generate DQPSK. Unfortunately, the coupling to the center arm was significantly less than 26% (estimated to be 14%) due to larger than expected waveguide undercut, as can be seen by the narrowness of the center waveguide on the right in FIG. 3d. Because I have only one static phase shifter on each outer arm, the best I could do was attenuate one of the outer arms and phase shift the other. This led to a higher insertion loss and a small eye opening. The fiber-to-fiber insertion loss of the modulator was ~40 dB at 1540 nm in the DQPSK condition: ~12 dB is due to inherent loss in the modulator design, ~2 dB due to the center waveguide having too low of coupling and so having to attenuate an outer arm, ~6 dB due to fiber coupling, ~3 dB due to no anti-reflection coatings, ~4 dB due to star-coupler excess loss, ~3 dB due to waveguide scattering loss, and ~10 dB due to absorption in the QWs in the passive sections. The last contribution could be eliminated in the future by using a different bandgap for the passive waveguide than the EAMs, and integrated SOAs could compensate for the other losses. The modulator output was amplified and sent through an 18.7-ps Mach-Zehnder delay interferometer in a silica planar lightwave circuit and finally to a balanced photodetector pair. The measured DQPSK eye diagram 500 is shown in FIG. 5 a $2^7$−1 PRBS.

I programmed the receiver of the bit-error rate (BER) tester with the expected pattern for DQPSK and measured the BER. With a $2^7$−1 PRBS, the best tributary exhibited a BER of ~6×10$^{-4}$. With a $2^{15}$−1 PRBS and using a pulse carver after the modulator, the best tributary exhibited a BER of ~1×10$^{-3}$. The BER is mainly limited because of inter-symbol interference and the fact that I could not achieve the desired amplitude and phase in all three arms, as mentioned earlier.

I just described one of many possible implementations of the present invention. Other possible implementations include using hybrid integration instead of monolithic integration. For example, the EAMs could be in InP, but the passive waveguides and couplers could be silicon or silica. SOAs could be integrated into the interferometer, anywhere in the center arm, but before the modulators in the outer two arms, in order to avoid nonlinear distortion in the SOAs, to provide a higher output power.

Figure 6:
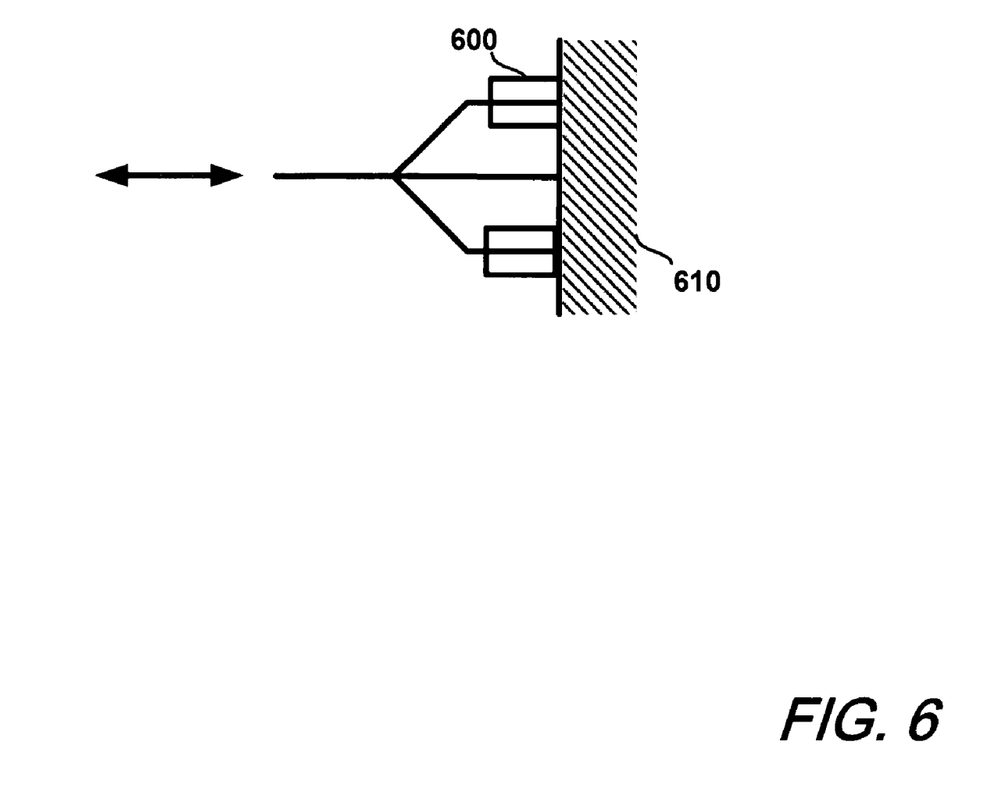
FIG. 6 is a reflective embodiment of the present invention.
Figure 7:
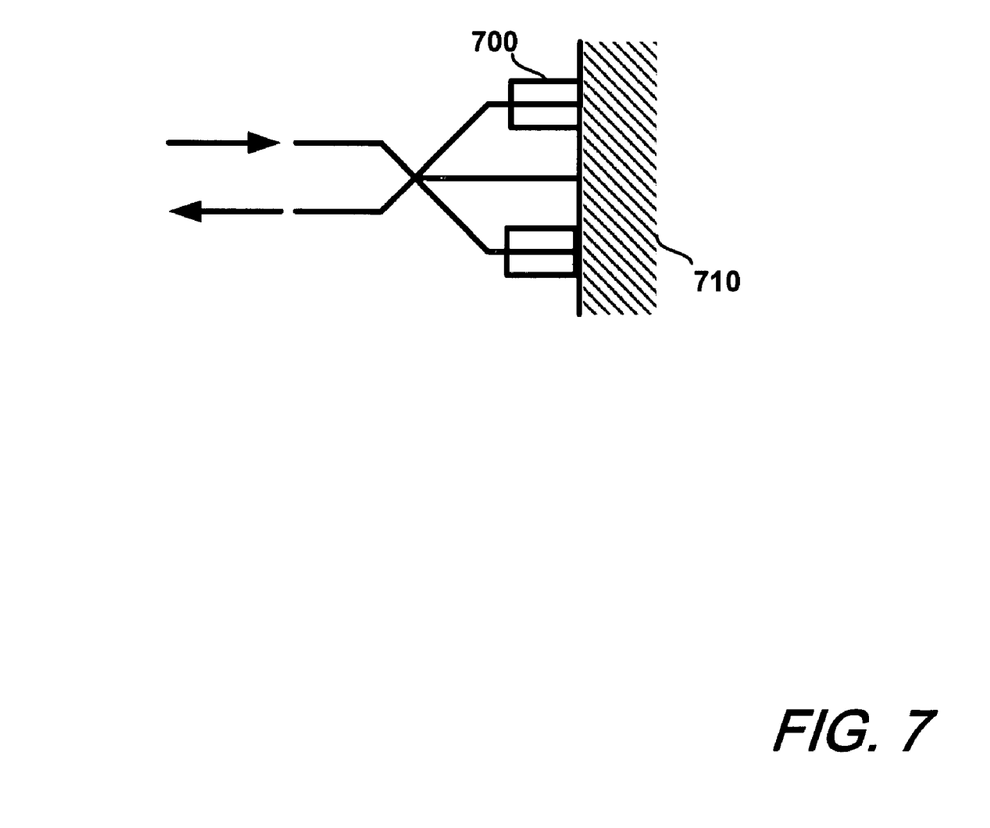
FIG. 7 is another reflective embodiment of the present invention.

There are also reflective designs to consider. For example, one could use the reflective design of FIG. 6, in which a mirror, 610, has been placed in the interferometer 600. The advantages to this design include a smaller device and a shorter EAM, which gives less capacitance and thus higher speed. An optical circulator is needed to extract the reflected, modulated signal. FIG. 7 shows a similar design for an interferometer 700 wherein a reflective surface 710 is included therein, except that a 2×3 coupler is used, instead of a 1×3 coupler. This eliminates the need for an optical circulator.

While I have discussed and described my invention using some specific examples, those skilled in the art will recognize that my teachings are not so limited. Accordingly, my invention should be only limited by the scope of the claims attached hereto.

What is claimed is:

1. An optical modulator for generating a quadrature phase-shift keyed signal comprising:
    an optical interferometer with at least three arms;
    CHARACTERIZED IN THAT:
    at least two of the arms each contain an intensity modulator;
    wherein the interferometer has three arms, and the power ratios in the three arms are substantially 37% for each of the two arms containing the modulators and substantially 26% for the third arm.

2. The optical modulator of claim 1, wherein one or more of the intensity modulators is an electro-absorption modulator.

3. The optical modulator of claim 1, wherein the interferometer includes a reflective surface for reflecting light therein.

4. An optical modulator for generating a quadrature phase-shift keyed signal comprising:
    an optical interferometer with at least three arms;
    CHARACTERIZED IN THAT:
    at least two of the arms each contain an intensity modulator;
    wherein the interferometer has three arms, and the relative phase between the two arms containing the modulators is substantially +/−90 degrees, and the relative phase between the third arm and those two arms is substantially +/−135 degrees.

5. The optical modulator of claim 4, wherein one or more of the intensity modulators is an electro-absorption modulator.

6. The optical modulator of claim 4, wherein the interferometer includes a reflective surface for reflecting light therein.

* * * * *